United States Patent [19]

Sommer

[11] Patent Number: 4,683,661
[45] Date of Patent: Aug. 4, 1987

[54] MEASURING GAUGE

[76] Inventor: Benjamin Sommer, 1004 W. Oak Glen Dr., Peoria, Ill. 61614

[21] Appl. No.: 727,333

[22] Filed: Apr. 25, 1985

[51] Int. Cl.⁴ .............................................. G01B 5/18
[52] U.S. Cl. .................................... 33/169 B; 33/532
[58] Field of Search ............ 33/519, 531, 532, 169 R, 33/169 B, 199 R, 143 M, 143 R, 143 J, 143 K, 162, 168 R, 168 B

[56] References Cited

U.S. PATENT DOCUMENTS

| 284,702 | 9/1883 | Wyke ............................ 33/199 R X |
| 468,903 | 2/1892 | Carr . |
| 1,567,134 | 12/1925 | Gosnell . |
| 1,597,636 | 8/1926 | Sykes . |
| 2,265,234 | 12/1941 | Jensen ............................. 33/162 X |
| 2,466,185 | 4/1949 | Stoothoff . |
| 2,550,508 | 4/1951 | Wiedemer . |
| 2,687,574 | 8/1954 | Heal . |
| 4,106,205 | 8/1978 | Wiederkehr ......................... 33/519 |
| 4,185,391 | 1/1980 | Roley . |
| 4,342,153 | 8/1982 | Cole ................................. 33/532 X |

FOREIGN PATENT DOCUMENTS 120972 2/1948 Sweden ................................. 33/532

Primary Examiner—Harry N. Haroian
Attorney, Agent, or Firm—Niro, Scavone, Haller & Niro, Ltd.

[57] ABSTRACT

A gauge is disclosed for measuring the width between opposing walls of a tapered groove forming the peripheral rim of a pulley, gear or the like. A body member includes a projection portion positionable in the groove into engagement with the opposing walls thereof, and a handle portion for facilitating manual positioning of the projection portion within the groove. A gauge member is mounted on the body member for movement relative thereto in a direction oblique to the rim to bring the gauge member into abutting engagement with the rim. Indicia is provided on the gauge member for determining the penetration depth of the projection portion within the groove as a function of the relative positioning between the body member and the gauge member.

22 Claims, 5 Drawing Figures

MEASURING GAUGE

BACKGROUND OF THE INVENTION

This invention generally relates to measuring gauges and, particularly, to a gauge for measuring the width between opposing walls of a tapered groove in a pulley, gear or the like.

V-belt drives generally include a driving belt and two pulleys or sheaves. Torque and power are transmitted from a drive pulley mounted on a rotatable power source to a second pulley mounted on a drive shaft. Friction between the belt and the tapered pulley walls facilitates transmission of power between the two pulleys. Optimum friction is determined by the specific design of the pulley groove cross-section, as well as the material of the drive belt. Tapered pulley walls increase the surface pressure and friction between the belt and the pulleys thereby increasing the power transmitted between the pulleys.

After a period of use, the pulleys become worn creating a measurable enlargement of the pulley groove cross-section and an eventual cupping of the pulley walls. One use of this gauge is to quantitatively measure the amount of wear in the groove cross-section of a pulley.

Quantatatively measuring the amount of wear in the pulley groove cross-section provides a determination of the useful life of the V-belt drive pulleys. This is important because various types of motor, which are the predominant means for driving a variety of apparatus, appliances and machines, use V-belts as a driving component to transmit power. A worn V-belt pulley or sheave can cause significant losses in power efficiency, can shorten the life of the belt, and can cause the belt drive to be over tensioned due to excess slippage. The latter creates undue overloading of motor bearings which is a prime cause of motor failures.

Another use of gauges of measuring groove widths is in the area of gears to determine the amount of wear between opposing walls of gear teeth.

There is a need for providing a simple, yet accurate measuring gauge of the character described for measuring and determining wear, as well as pitch diameters in grooves of pulleys, gears or the like.

SUMMARY OF THE INVENTION

An object, therefore, of the invention is to provide a new and improved measuring gauge for determining the width between opposing walls of tapered grooves.

In the exemplary embodiment of the invention, a gauge is provided for measuring the width of a tapered groove forming the peripheral rim of a pulley, gear or the like. Generally, the gauge includes a body member having a projection portion positionable in the groove into engagement with the opposing groove walls, and a handle portion for facilitating manual positioning of the projection portion within the groove. A gauge member is mounted on the body member for movement relative thereto in a direction oblique to the rim to bring the gauge member into abutting engagement with the rim across the top of both opposing walls thereof. Indicia means are provided on the gauge member for determining the penetration depth of the projection portion within the groove as a function of the relative positioning between the body member and the gauge member.

Various embodiments of the gauge described above are disclosed herein. In one embodiment, the gauge member comprises a gauge slide mounted on the body member, with a generally straight edge linearly, obliquely slidable into abutting engagement across both opposing walls of the rim for measurement. Indicia means are located along the edge of the gauge slide and readable against corresponding indicia means on the projection portion of the body member.

Two forms of sliding engagement between the body member and gauge slide are disclosed. One form comprises a pin and slot connection between the gauge slide and body member. Another form comprises an inclined ramp connection between the gauge slide and body member.

In another embodiment of the invention, the gauge member comprises a gauge wheel eccentrically mounted on the body member with a peripheral circular edge tangentially, obliquely rotatable into abutting engagement with the rim. Indicia means are located along the circular edge of the gauge wheel.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
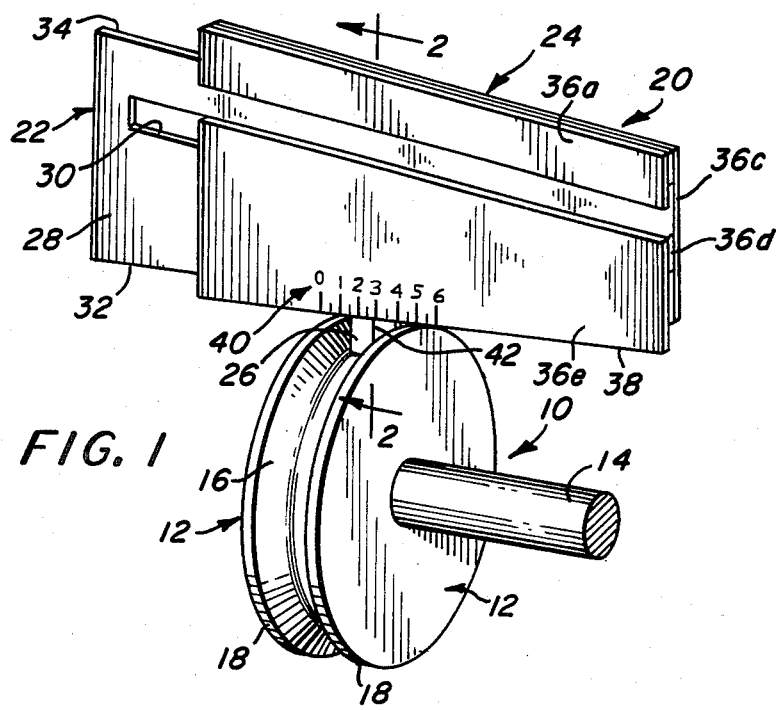
FIG. 1 is a perspective view of one embodiment of the gauge of this invention, including a gauge slide, and illustrated in operative position in conjunction with a pulley.

Referring to the drawings in greater detail, and first to FIG. 1, a V-belt pulley, generally designated 10, typically includes a pair of sheave sections, generally designated 12, mounted on a shaft or hub 14. The sheave sections have opposing walls 16 defining a tapered groove, the tops of the walls forming a peripheral rim 18 of the pulley.

Figure 2:
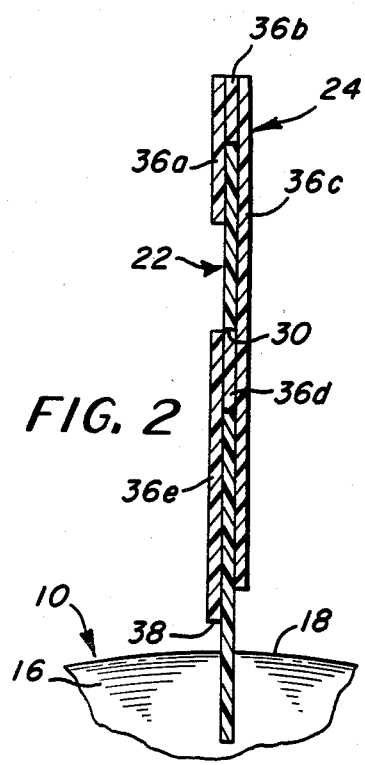
FIG. 2 is a section taken generally along plane 2—2 of FIG. 1.

FIGS. 1 and 2 illustrate one embodiment of the invention wherein the gauge includes a gauge slide. More particularly, a gauge, generally designated 20, is provided for measuring the width between opposing walls 16 of pulley 10. As understood hereinafter, the gauge also is equally aplicable for measuring pitch diameters of pulleys, as well as the wear within the pulley groove or the wear between opposing walls of gear teeth, or the like.

Gauge 20 includes a body member, generally designated 22, and a slide member, generally designated 24.

Body member 22 includes a projection portion 26 positionable in the groove of pulley 10 into engagement with opposing walls 16, and a handle portion 28 for facilitating manually positioning the projection portion within the groove. Body portion 28 is a relatively thin component and includes an open ended slot 30 extending at an angle to a lower edge 32 of handle portion 28 and generally parallel to an upper, inclined edge 34 of the handle portion. Projection portion 26 protrudes downwardly from lower edge 32 and is formed integral with handle portion 28.

Gauge member 24 comprises a gauge slide which is laminated of various thicknesses 36a, 36b, 36c, 36d and 36e. Laminates 36a and 36e form the front of gauge slide 24, with laminate 36e forming a generally horizontal lower edge for abutting engagement with rim 18 of pulley 10. Laminate 36c forms the back of gauge slide 24 and is secured to laminates 36a, 36e by spacer laminates 36b, 36d. Laminate 36d forms a slide strip for moving within groove 30 of handle portion 28 of body member 22.

It should be understood by one skilled in the art that gauge 20 and its component parts may be fabricated from a variety of moldable materials. Such materials may include, but are not limited to the non-plastic materials, metals and the like.

During operation of gauge 24 described above in relation to FIGS. 1 and 2, handle portion 28 of body member 22 is manipulated to position projection portion 26 into engagement with opposing walls 16 of pulley 10. Gauge slide 24 then is positioned lineraly and obliquely into abutting engagement across both opposing walls 16 of rim 18 of pulley 10, as groove 30 in body portion 28 forms a ramp for sliding interengagement with slide laminate 36d of gauge slide 24. Numerical indicia means, generally designated 40 (FIG. 1), are provided along lower edge 38 of slide gauge laminate 36e. This indicia is readable against corresponding indicia means in the form of a central line 42 (FIG. 1) on projection portion 26 of body member 22. Thus, with the body member stationary as projection portion 26 abuts the side walls of the groove, the relative position of gauge slide 24 and its respective numerical indicia 40 will determine the penetration depth of the projection portion 26 within the groove as a function of the relative positioning between body member 22 and gauge slide 24. Such determination results in a numerical indication of the penetration depth of projection portion 26 by indicia 40.

Figure 3:
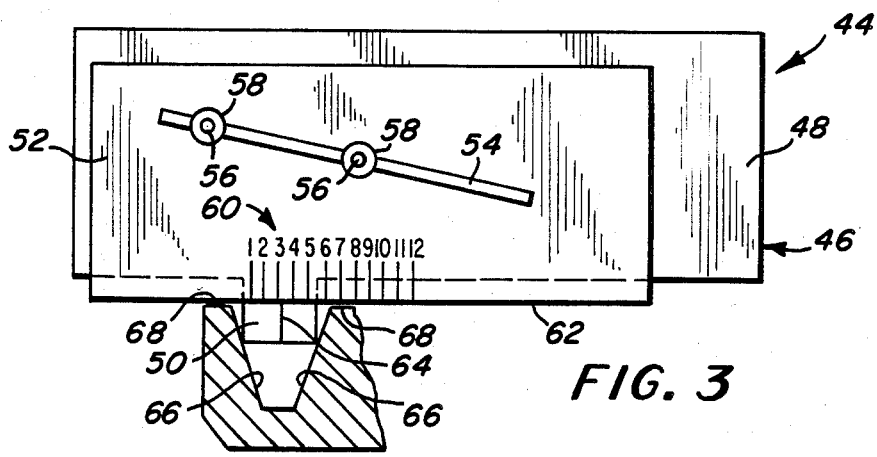
FIG. 3 is a front elevation of another form of gauge embodying a gauge slide.

FIG. 3 shows another form of the gauge, generally designated 44, utilizing a different form of gauge slide. More particularly, a body member, generally designated 46, includes a handle portion 48 and a projection portion 50 which are used as described above in relation to body member 22, handle portion 28 and projection portion 26 in relation to gauge 20 in FIGS. 1 and 2. However, gauge 44 includes a gauge slide 52 having an inclined, closed slot 54 formed therein. A pair of pins 56 protrude forwardly of body member 46, through slot 54, and gauge slide 52 is maintained against the front of body member 46 by enlarged head portions 58 on the distal ends of pins 56. Head portions 58 are wider than slot 54 and engage the front of gauge slide 52 on opposite sides of the slot. Numerical indicia means, generally designated 60, are provided along a lower linear edge 62 of gauge slide 52. Indicia means 60 is readable against corresponding indicia means in the form of a center line 64 on projection portion 50 of body member 46.

Gauge 44 of FIG. 3 functions as described in relation to gauge 20 of FIGS. 1 and 2. Handle portion 48 is manipulated to position projection portion 50 into engagement with opposing walls 66 of an appropriate groove to be measured. Gauge slide 52 then is moved, with pins 56 riding in slot 54, until lower edge 62 of the gauge slide is in abutting engagement across the top of both opposing walls 66 of rim 68. Indicia means 60, 64 provide a measurement of the penetration depth of projection portion 50 within the groove as a function of the relative positioning between body member 46 and gauge slide 52. Gauge 44 is shown in conjunction with a groove formed by opposing walls 66, such as the opposing walls between a pair of gear teeth, a multiple grooved pulley or the like. All of the embodiments disclosed herein are equally applicable for determining the pitch diameter or wear in a pulley, for instance, as well as the wear in gear teeth or the like.

Figure 4:
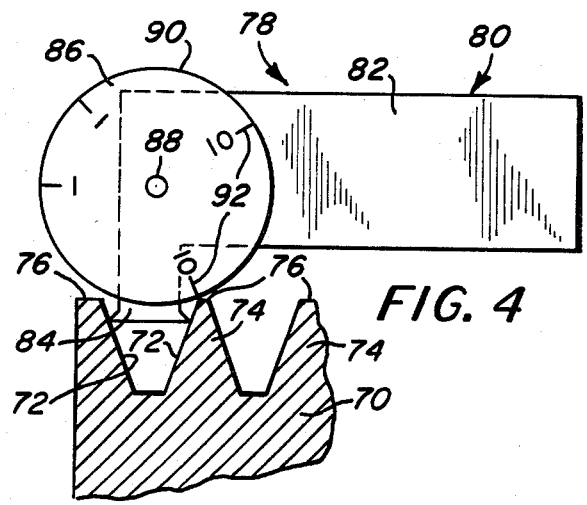
FIG. 4 is a front elevation of a second embodiment of the invention employing a gauge wheel, with the gauge in position measuring an unworn groove.
Figure 5:
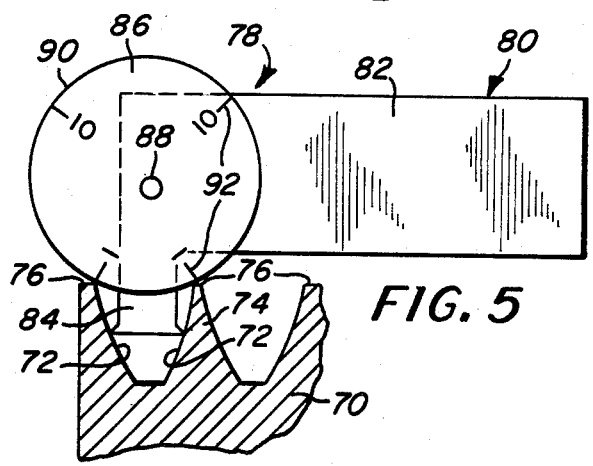
FIG. 5 is a front elevation of the gauge of FIG. 4, with the gauge in position measuring a worn groove.

FIGS. 4 and 5 show a second embodiment of the invention which employs a gauge wheel versus the gauge slides described in relation to FIGS. 1-3. More particularly, a multigroove sheave 70 is shown with opporing tapered walls 72 forming a peripheral rim 76 of the sheave. A gauge, generally designated 78, is provided for measuring the width between opposing walls 72 to determine the amount of wear therébetween.

Like gauges 24 and 44, gauge 78 includes a body member, generally designated 80. The body member includes a handle portion 82 and a projection portion 84 usable as described in relation to gauges 24, 44. However, the embodiment of FIGS. 4 and 5 include a gauge wheel 86 eccentrically mounted at 88 to body member 80, and preferably to handle portion 82, with a peripheral circular edge tangentially, obliquely rotatable into abutting engagement with rim 76 of sheave 70. Numerical indicia means 92 are located along circular edge 90 of the gauge wheel.

In operation, FIG. 4 illustrates sheave 70 in an unworn condition with projection portion 84 positioned in engagement with opposing walls 72 of a multigroove sheave. The circular edge 90 of guage wheel 86 is rotated tangentially into engagement with either rim of the sheave. Indicia 92 is such as to incidate an unworn or useful groove dimension.

FIG. 5 illustrates projection portion 84 in engagement with the opposing walls of a substantially worn sheave. It can be seen that the projection portion extends considerably further downwardly into the groove between the opposing walls. However, upon rotating gauge wheel 86 to bring its circular edge 90 obliquely into engagement with rim 76, it can be seen that the wheel rotates about its eccentric mounting a lesser extent because of the greater penetration of projection portion 84. Of course, indicia 92 thereby determines the penetration depth of the projection portion within the groove as a function of the relative rotatable position between the gauge wheel and body member 80 by providing a measurement of such penetration.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A gauge for measuring the width between opposing walls of a tapered groove forming the peripheral rim of a pulley, gear or the like, comprising:
   a body member including a projection portion positionable in said groove into engagement with the opposing walls thereof;
   a gauge member mounted on the body member for movement relative thereto in a direction oblique to said rim to bring the gauge member into abutting engagmeent with the rim; and
   indicia means on said gauge member located along an edge thereof engagable with the rim and indicia means on the projection portion of said body member for determining the penetration depth of said projection portion within the groove as a function of the relative positioning between the body member and the gauge member.

2. The gauge of claim 1 wherein said body member includes a handle portion for facilitating manual positioning of the projection portion within the groove.

3. The gauge of claim 1 wherein said gauge member comprises a gauge slide mounted on the body member with a generally straight edge linearly obliquely slidable into abutting engagement with the rim.

4. The gauge of claim 3 wherein said indicia means are located along said edge of said gauge slide.

5. The gauge of claim 4, including corresponding indicia means located on the projection portion of said body member.

6. The gauge of claim 3 wherein said gauge slide is slidably mounted on the body member by means of a pin and slot connection.

7. The gauge of claim 6 wherein said pin and slot connection comprises at least a pair of pins projecting from the body member and slidably received within a linear inclined slot in the gauge slide.

8. The gauge of claim 3 wherein said gauge slide is slidably mounted on the body member by an inclined ramp connection.

9. A gauge for measuring the width between opposing walls of a tapered groove forming the peripheral rim of a pulley, gear or the like, comprising:
   a body member including a projection portion positionable in said groove into engagement with the opposing walls thereof;
   a gauge wheel eccentrically mounted on the body member with a peripheral circular edge tangentially, obliquely rotatable into abutting engagement with the rim; and
   indicia means on said gauge wheel for determining the penetration depth of said projection portion within the groove as a function of the relative positioning between the body member and the gauge wheel.

10. The gauge of claim 9 wherein said indicia means are located along said circular edge of said gauge wheel.

11. A gauge for measuring the width between opposing walls of a tapered groove forming the peripheral rim of a pulley, gear or the like, comprising:
    a body member including a projection portion positionable in said groove into engagement with the opposing walls thereof, and a handle portion for facilitating manual positioning of the projection portion within the groove;
    a gauge slide mounted on the body member with a generally straight edge linearly, obliquely slidable into abutting engagement with the rim; and
    indicia means on said straight edge of said gauge slide and corresponding indicia means located on said projection portion of said body member for providing a measurement of the penetration depth of said projection portion within the groove as a function of the relative positioning between the gauge slide and the body member.

12. The gauge of claim 11 wherein said gauge slide is slidably mounted on the body member by means of a pin and slot connection.

13. The gauge of claim 12 wherein said pin and slot connection comprises at least a pair of pins projecting from the body member and slidably received within a linear inclined slot in the gauge slide.

14. The gauge of claim 11 wherein said gauge slide is slidably mounted on the body member by an inclined ramp connection.

15. The gauge of claim 14 wherein said inclined ramp connection provides an indication of the depth of penetration of said projection portion as a function of the relative positioning of said body member and said guage slide along said inclined ramp connection.

16. A gauge for measuring the width between opposing walls of a tapered groove forming the peripheral rim of a pulley, gear or the like, comprising:
    a body member including a projection portion positionable in said groove and into engagement with the opposing walls thereof, and a handle portion for facilitating manual positioning of the projection portion within the groove;
    a gauge wheel eccentrically mounted on the body member with a peripheral circular edge tangentially, obliquely rotatable into abutting engagement with the rim; and
    indicia means on said gauge wheel for measuring the penetration depth of said projection portion within the groove as a function of the relative rotated position between the gauge wheel and the body member.

17. The gauge of claim 16 wherein said indicia means are located along said circular edge of said gauge wheel.

18. A gauge for measuring the width between opposing walls of a tapered groove forming a peripheral rim of a pulley, gear or the like, comprising:
    a body member including a projection portion positionable in said groove into engagement with the opposing walls thereof;
    a gauge member mounted on the body member for movement relative thereto in a direction oblique to said rim to bring the gauge member into abutting engagement with the rim; and
    indicia means on said gauge member located along an edge thereof, and corresponding indicia means located on said body member for determining the penetration depth of said projection portion within the groove as a function of the relative positioning between the body member and the gauge member.

19. The gauge of claim 18 wherein said gauge member comprises a gauge slide mounted on the body member with a generally straight edge linearly, obliquely slidable into abutting engagement with the rim.

20. The gauge of claim 19 wherein said gauge slide is slidably mounted on the body member by an inclined ramp connection.

21. The gauge of claim 20 wherein said incline ramp connection provides an indication of the depth of penetration of said projection portion as a function of the relative positioning of said body member and said gauge slide along said inclined ramp connection.

22. A gauge for measuring the width between opposing walls of a tapered groove forming the peripheral rim of a pulley, gear or the like, comprising:
- a body member including a projection portion positionable between the opposing walls of said groove forming the peripheral rim of said pulley, said projection portion moveable into engagement with the opposing walls of said groove;
- a gauge member mounted on the body member for movement relative to said body member in a direction oblique to said rim to bring the gauge member into abutting engagement across the walls of said tapered groove; and
- indicia means on said gauge member located along an edge thereof, and corresponding indicia means located on said body member readable against the indicia means on said gauge member for determining the penetration depth of said projection portion within the groove and between said opposing walls as a function of the relative positioning between the body member and the gauge member.

* * * * *